May 10, 1927.  
R. N. WILSON  
CHAIN TIGHTENER  
Filed Dec. 28, 1926
1,628,019
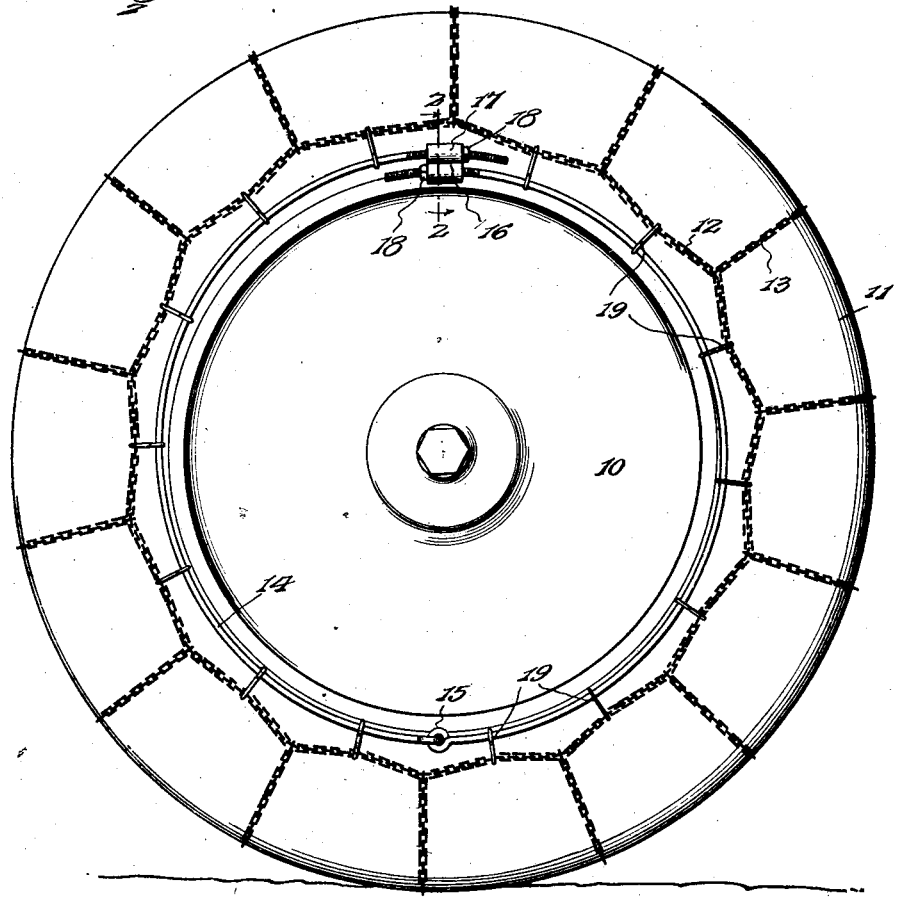
Inventor  
R. N. Wilson.  
By Lacey & Lacey, Attorneys Patented May 10, 1927.

1,628,019

UNITED STATES PATENT OFFICE.

ROBERT N. WILSON, OF COLEGROVE, PENNSYLVANIA.

CHAIN TIGHTENER.

Application filed December 28, 1926. Serial No. 157,586.

This invention relates to an improved motor vehicle skid chain tightener, the present application being a continuance, in part, of my pending application for chain tightener, filed March 19, 1926, Serial No. 95,971.

The invention seeks, among other objects, to provide a tightener which will function at all times to hold the cross chains of a skid chain snugly about a wheel tire so that whipping of said cross chains with attendant noise and undue wear, will be prevented.

The invention seeks, as a further object, to provide a device wherein, even though the cross chains are at all times held snugly about the tire, the skid chain will, nevertheless, be permitted to creep circumferentially of the tire substantially in the usual manner as the wheel revolves so that localized wear and abrasion of the tire will be avoided.

A further object of the invention is to provide a tightener eliminating the use of tensioning springs, which springs, as now commonly employed, allow the tire, when the wheel is subjected to heavy torque and pull, to spin within the skid chain while also, said springs soon lose their tension and become a nuisance.

Still another object of the invention in this connection, is to provide a tightener wherein the side member employed will be of a stiffness to sustain outward pulling stress of the tire chain and distribute such stress lineally of said member without elongation or distortion of said member so that when the wheel is subjected to heavy torque and pull, as when in a rut or ascending a grade, pulling stress on any one of the cross chains at the bottom of the wheel will be communicated by said side member to the cross chains at the top portion of the wheel with the result that the latter cross chains will be caused to tightly grip the tire and prevent spinning of the tire within the skid chain.

And the invention seeks, as a still further object, to provide a tightener which may be easily and quickly attached to conventional skid chains without the necessity for structural change therein and which may be adjusted to meet the requirements of wheels of different sizes.

Other objects of the invention not specifically mentioned in the foregoing will appear during the course of the following description.

In the accompanying drawings,

Figure 1 is a side elevation showing my improved tightener in connection with a conventional motor vehicle wheel, tire and skid chain, Figure 2 is a transverse sectional view on the line 2—2 of Figure 1, looking in the direction indicated by the arrows, and Figure 3 is a detail perspective view showing one of the tire chain engaging elements employed.

In order that the construction and operation of my improved chain tightener may be better understood I have, in the drawings, shown the device in connection with a conventional motor vehicle wheel 10 and tire 11. I have also illustrated a conventional tire chain including the usual side chains 12 and cross chains 13, which latter span the tire transversely to lie against the tread thereof.

In accordance with the present improvements, I provide a rigid annular side member 14 which may be formed of heavy gage wire and preferably, although not necessarily, said member is composed of companion semi-circular sections bent at corresponding ends thereof to provide eyes 15 swingingly connecting the sections so that the tightener may be more compactly folded. At their opposite ends the sections are threaded, and coupling said ends of the sections is a connector 16. This connector is preferably formed of a single strip of resilient metal and, as shown in Figure 2, the end portions of said strip are rolled in opposite directions to provide sleeves 17 loosely receiving the threaded ends of the sections therethrough. Thus, the threaded ends of the sections are disposed in overlapping relation, and screwed thereon to coact with the sleeves 17 of the connector are nuts 18 adjustable for contracting the side member. As will be observed the free ends of the sections are threaded for a considerable distance and by disposing said ends in overlapping relation so as not to abut or interfere with each other when said ends are relatively shifted, a wide range of adjustment is provided sufficient to meet the requirements of different sized wheels. Loosely mounted on the side member 14 is a plurality of tire chain engaging elements 19. These elements are each preferably formed from a length of heavy gage wire bent at one end to provide an eye 20 and at its opposite end to define a hook 21, the eyes of the several members loosely receiving the side member 14 therethrough. As shown in Figure 1, the hooks 21 of said elements are engaged with the outer side chain 12 of the tire chain at points substantially midway between the cross chains 13 for connecting the device with the tire chain.

In applying the device, the nuts 18 are first screwed towards the free ends of the sections of the side member 14 when the hooks 21 are engaged with the outer side chain of the tire chain in the manner indicated. The nuts 18 are then adjusted for contracting the side member 14 until the cross chains 13 are drawn snugly about the tire. Preferably, the outer side chain of the tire chain is then sharply pulled with the hands away from the tire for taking up any slack in the tire chain and tensioning the cross chains so that said cross chains will assume an approximately equal spacing with respect to each other. The nuts 18 are then again adjusted to take up any slack developed by the pulling operation so that finally, the tightener will hold the side chains of the tire chain more or less taut and also hold the cross chains snugly about the tire.

Attention is now directed to the fact that the chain engaging elements 19 are not only mounted to slide freely along the side member 14 as well as rock transversely with respect to said member, but are also mounted to rock in the plane of said member. Accordingly, as pull occurs upon each of the cross chains 13 successively, as the wheel revolves, the elements 19 will freely swing, under the stress, in the plane of the side member 14 so that the tire chain will be permitted to creep circumferentially of the tire in substantially the usual manner, the tightener turning as a unit with the tire chain as the tire chain creeps. Furthermore, it is to be noted that the side member 14 is of a stiffness to sustain outward pulling stress of the tire chain on the elements 19, and distribute such stress lineally of said member without elongation or distortion of the shape of said member. Accordingly, when the wheel is subjected to heavy torque and pull as when in the mud or ascending a grade, pulling stress on any one of the cross chains at the bottom of the wheel will be communicated by said member to the cross chains at the top portion of the wheel. As a result, the cross chains at the top portion of the wheel will all be caused to grip the tire with a force more or less corresponding to the pulling stress exerted on the cross chain at the time at the bottom of the wheel and prevent spinning of the tire within the tire chain. The device will thus be found to be equally as efficient under extreme demands as when traveling along a more or less smooth roadway while, at no time, will whipping of the cross chains be permitted.

Having thus described the invention, what I claim is:

1. In a tire chain tightener, the combination of a rigid side member, and tire chain engaging elements loosely mounted on said member for free rocking movement in the plane of said member, said member being of a stiffness to sustain outward pulling stress of a tire chain on said elements and distribute such stress lineally of said member without elongation thereof and distortion of the shape of said member, and means for adjustably contracting said member with the ends thereof in overlapping relation.

2. The combination with a wheel and tire, and a tire chain encircling the tire and adapted to creep circumferentially of the tire as the wheel revolves, of a tire chain tightener including a rigid side member, and a plurality of elements carried by said member and engaged with the tire chain at spaced points circumferentially thereof for holding the tire chain snugly about the tire, said member being of a stiffness to sustain outward pulling stress of the tire chain on said elements and distribute such stress lineally of said member without elongation thereof and distortion of the shape of said member and said elements being loosely mounted on said member for free rocking movement in the plane thereof whereby the tire chain and the tightener will creep as a unit as the wheel revolves.

In testimony whereof I affix my signature.

ROBERT N. WILSON. [L. S.]